(12) United States Patent
Petran

(10) Patent No.: US 8,919,037 B1
(45) Date of Patent: Dec. 30, 2014

(54) METHOD AND SYSTEM OF PREVENTING PLASTIC OUT-GASSING IN PLANT TUNNELS

(71) Applicant: Andrew Petran, St. Paul, MN (US)

(72) Inventor: Andrew Petran, St. Paul, MN (US)

(*) Notice: Subject to any disclaimer, the term of this patent is extended or adjusted under 35 U.S.C. 154(b) by 185 days.

(21) Appl. No.: 13/621,424

(22) Filed: Sep. 17, 2012

Related U.S. Application Data

(60) Provisional application No. 61/535,709, filed on Sep. 16, 2011.

(51) Int. Cl.
A01G 9/24 (2006.01)

(52) U.S. Cl.
CPC .......................... *A01G 9/24* (2013.01)
USPC .................. 47/17; 47/20.1; 47/32.3

(58) Field of Classification Search
CPC ....... A01G 13/04; A01G 13/043; A01G 9/16; A01G 9/246; A01G 9/14; A01G 9/1438; A01G 9/20; A01G 7/045; A01G 9/243; A01G 9/24; A01G 13/0206; A01G 13/0281; A01G 13/0231; A01G 9/18; A01G 13/0237; A01G 13/0243; A01G 13/10; A01G 7/02; A01G 13/02; A01G 9/242
USPC ............. 47/20.1, 21.1, 29.5, 29.6, 29.7, 32.3, 47/23.1, 23.2, 23.3, 29.1, 29.2, 29.3, 17, 47/19.1, 19.2, 60, 61
See application file for complete search history.

(56) References Cited

U.S. PATENT DOCUMENTS

| | | | | |
|---|---|---|---|---|
| 3,870,873 | A * | 3/1975 | Mallory | 362/2 |
| 4,430,828 | A * | 2/1984 | Oglevee et al. | 47/17 |
| 4,856,227 | A * | 8/1989 | Oglevee et al. | 47/17 |
| 5,001,859 | A * | 3/1991 | Sprung | 47/17 |
| 8,689,483 | B2 * | 4/2014 | Lin et al. | 47/17 |
| 2004/0194371 | A1 * | 10/2004 | Kinnis | 47/17 |
| 2007/0289207 | A1 * | 12/2007 | May et al. | 47/17 |
| 2009/0025287 | A1 * | 1/2009 | Lee | 47/17 |
| 2010/0042234 | A1 * | 2/2010 | May et al. | 700/90 |
| 2010/0289411 | A1 * | 11/2010 | Smits et al. | 315/113 |
| 2011/0153053 | A1 * | 6/2011 | Kim et al. | 700/103 |

* cited by examiner

*Primary Examiner* — Trinh Nguyen
(74) *Attorney, Agent, or Firm* — Crawford Maunu PLLC

(57) ABSTRACT

Aspects of the present disclosure are directed towards methods, systems and apparatuses for preventing plastic out-gassing in plant tunnels. The methods, systems and apparatuses utilize various sensors and elements to maintain a proper plant growth environment while minimizing the outgassing.

17 Claims, 9 Drawing Sheets

Black plastic, 24-Hour Trial

Regular plastic, 24-Hour Trial

Black plastic, 48-Hour Trial

IR-AC plastic, 48-Hour Trial

Regular plastic, 48-Hour Trial

US 8,919,037 B1

METHOD AND SYSTEM OF PREVENTING PLASTIC OUT-GASSING IN PLANT TUNNELS

RELATED PATENT DOCUMENT

This patent document claims benefit under 35 U.S.C. §119 of U.S. Provisional Patent Application Ser. No. 61/535,709 entitled "Method and System of Preventing Plastic Out-Gassing in Plant Tunnels" and filed on Sep. 16, 2011; this patent document is fully incorporated herein by reference.

Growing interest in season extension by organic growers has resulted in an explosive increase in plastic-covered low and high tunnels in field production. A low tunnel can be constructed using a plastic supportive hoop, typically PVC, and a plastic greenhouse cover, such as polyethylene. The plastic cover is placed over the supportive hoops so that a tunnel is formed. A high tunnel is constructed from similar materials. The difference between a high and low tunnel is the amount of volume that is contained under the tunnel, the high tunnel having a greater height and width than a low tunnel, and therefore a greater volume.

The risks associated with the increased use of plastics have not been fully considered with respect to contamination from out-gassed molecules from plastics exposed to high light, high temperature environments. Both the plastic supportive hoops and the plastic coverings used in high and low tunnel season extension in organic production systems could be a source of out-gassed contaminates. These compounds, if absorbed by the plant could affect plant yield and could be a source of low-level, unwanted synthetic compounds in organically grown vegetables. As high and low tunnels become increasingly popular in organic agriculture throughout the United States, the understanding of the nature of the tunnels and the risks associated with the tunnels needs to improve so organic farmers can make more informed decisions when they consider implementing high or low tunnels on their own farms. Therefore, there exists a need to prevent plastic out-gassing in high and low plant tunnels.

In connection with the present disclosure, discoveries and related solutions are provided for sensing and reducing measurable out-gassing from PVC and related chemical materials when exposed to typical organic field conditions. The potential for plant, and therefore consumer exposure, to potential toxins from these agricultural plastics should be a fundamental concern of the organic industry. By sensing, collecting and analyzing adverse compounds released from agricultural plastics, in addition to offsetting the fixed conditions that spur these release, plastics that outgas less than other plastics are identified, and a protocol is established for evaluating plastics for out-gassing under controlled (or "offset") conditions. This information and developed method is used to monitor out-gassing of plastics by trapping molecules in the atmosphere in low and high tunnels, and by quantifying levels of out-gassed molecules in plant tissue grown in plant tunnels.

The use of plastics in plant growth, however, whether it be domestic, industrial or agricultural, poses the risk of releasing volatile organic chemicals (VOCs) from the plastics into the surrounding area (e.g., leaching and out-gassing). For example, studies have found a wide range of VOCs present in water being transported by high density polyethylene, crossbonded polyethylene and PVC pipes. Further, a study found significant amounts of bisphenol A, a toxin linked to cardiovascular disease and diabetes, in humans after only two weeks of using polycarbonate drinking bottles. Polyester (PE) is a cheap plastic commonly used for tunnel coverings; however, moderate levels of out-gassing were measured from PE that corroded away metal tools when PE was used in packaging. Aclar 22C and 33C are plastics that are used for tunnel coverings, but are much more expensive than PE. The Aclar plastics were found to be significantly less prone to out-gassing than PE, and had little to no effect on metal tools when they were used in packaging.

Very little research exists concerning out-gassing around plastics used in greenhouse agriculture when exposed to light and temperatures in field environments. Leaching of phthalate esters from PVC hoop skeletons into greenhouse soil has been researched, but the study did not test for out-gassing, either from the PVC hoops or from the plastic coverings used in the experiment.

Plastics used for agricultural season extension experience temperatures exceeding 35 C simultaneously with high irradiance levels. These conditions are likely to increase the out-gassing of volatiles that have not been polymerized during the synthesis of the plastic, and further accelerates the breakdown of the polymers to smaller molecules that would then volatize. Plastics commonly used in high and low tunnel coverings include heavy plastic used for high tunnels and thin plastics used in low tunnel season extension. Samples of black plastic commonly used as weed barriers are also included. Using plant growth chambers under conditions that represent reasonable field conditions, adverse releases (e.g., out-gassing) may be sensed and measured. Day temperatures will be 35 C, night temperatures will be 10 C. These temperatures differences may seem large, but our data shows that temperatures inside low tunnels on a sunny day can easily reach 35 C and the night temperatures on a clear night reach 10 C. The growth chambers are capable of producing 1200 umole of photons per square meter per sec to simulate spring mid-day irradiance levels. Absorbent material will be removed weekly for one month (total of four samples) from the chambers and the volatile organic compounds analyzed by gas chromatography-mass spectrometry (GC-MS).

The invention may be more completely understood in consideration of the following detailed description of various embodiments of the invention in connection with the accompanying drawings, in which.

Figure 1:
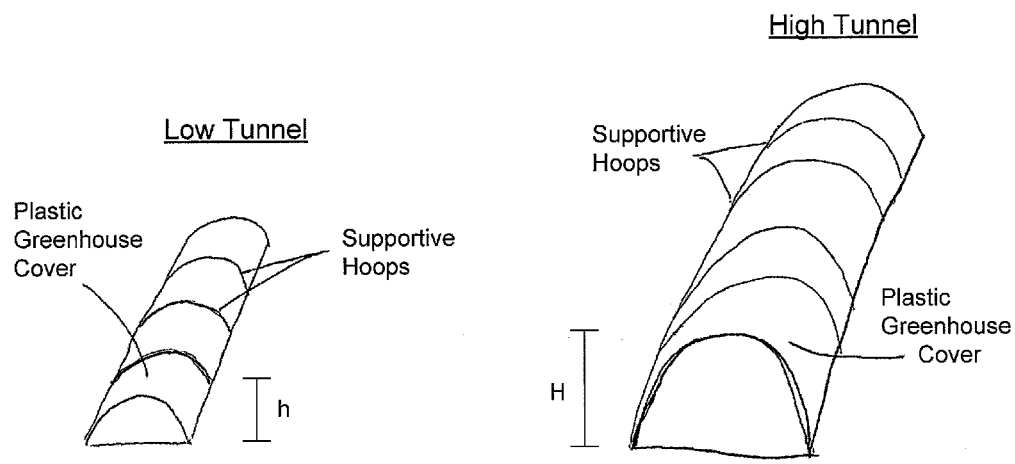
FIG. 1 is an example high tunnel and low tunnel in accordance with an example embodiment of the present invention.
Figure 2:
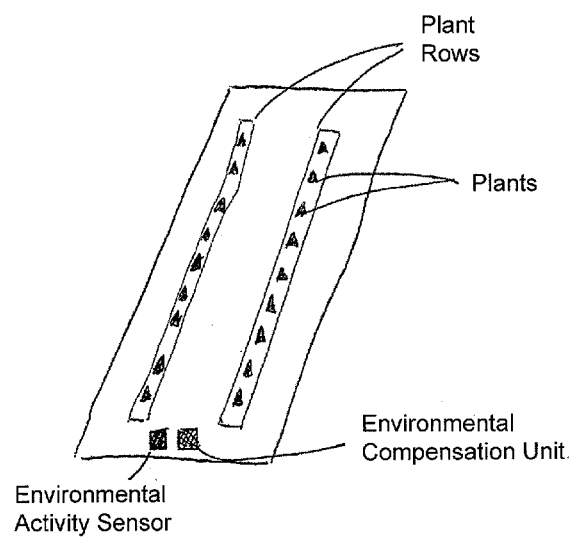
FIG. 2 shows an example system of preventing plastic out-gassing according to an example embodiment of the present invention.
Figure 3:
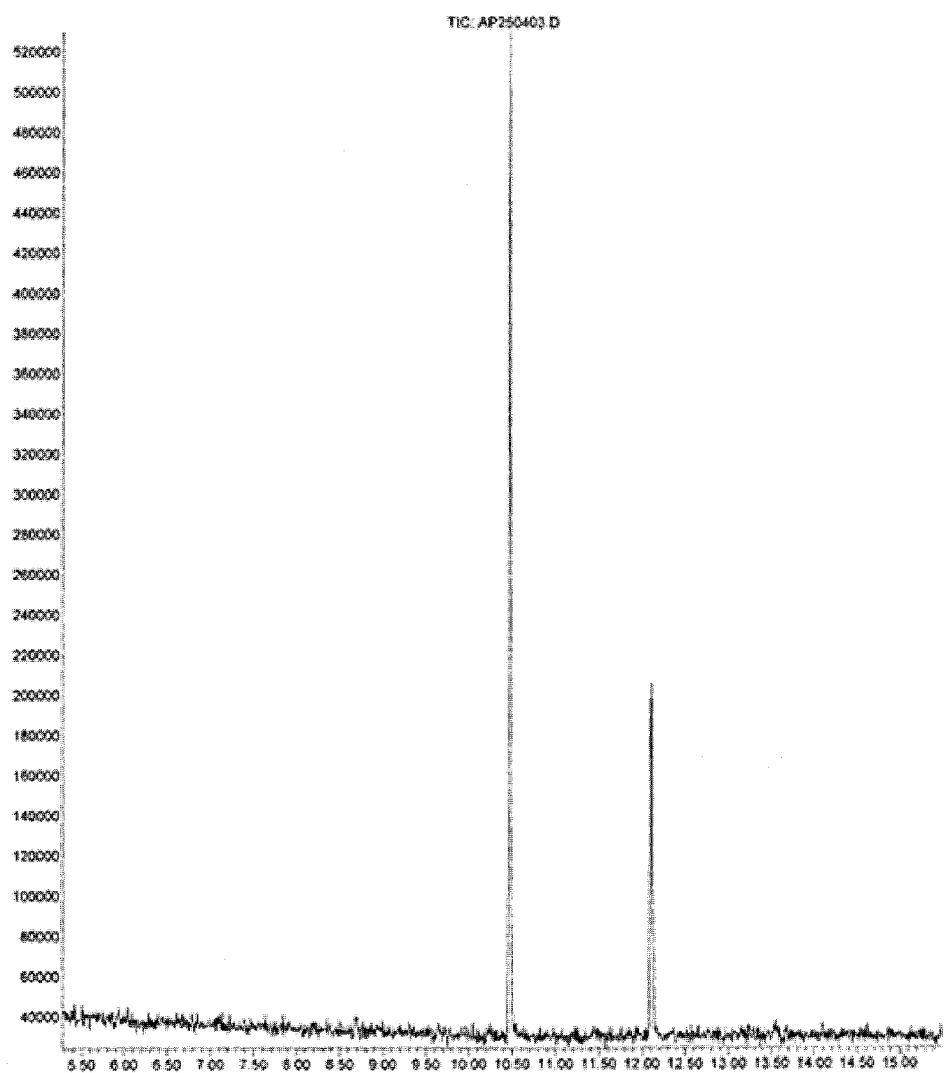
FIG. 3 shows an example negative control in a 24-hour trial determining whether outgassed VOCs from High or Low Tunnel plastics are caused by ultraviolet photo degradation.
Figure 4:
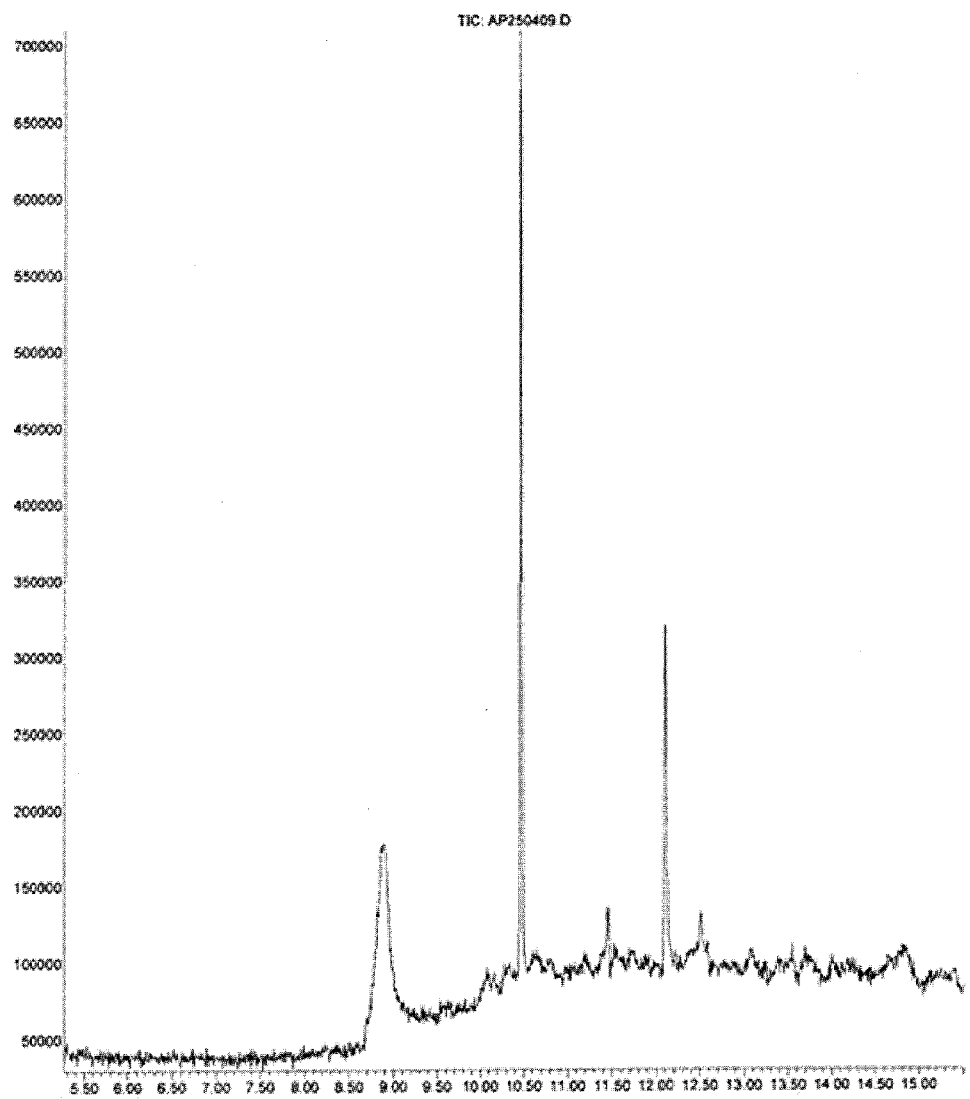
FIG. 4 shows an example 24-hour trial of outgassed VOCs from black plastic.
Figure 5:
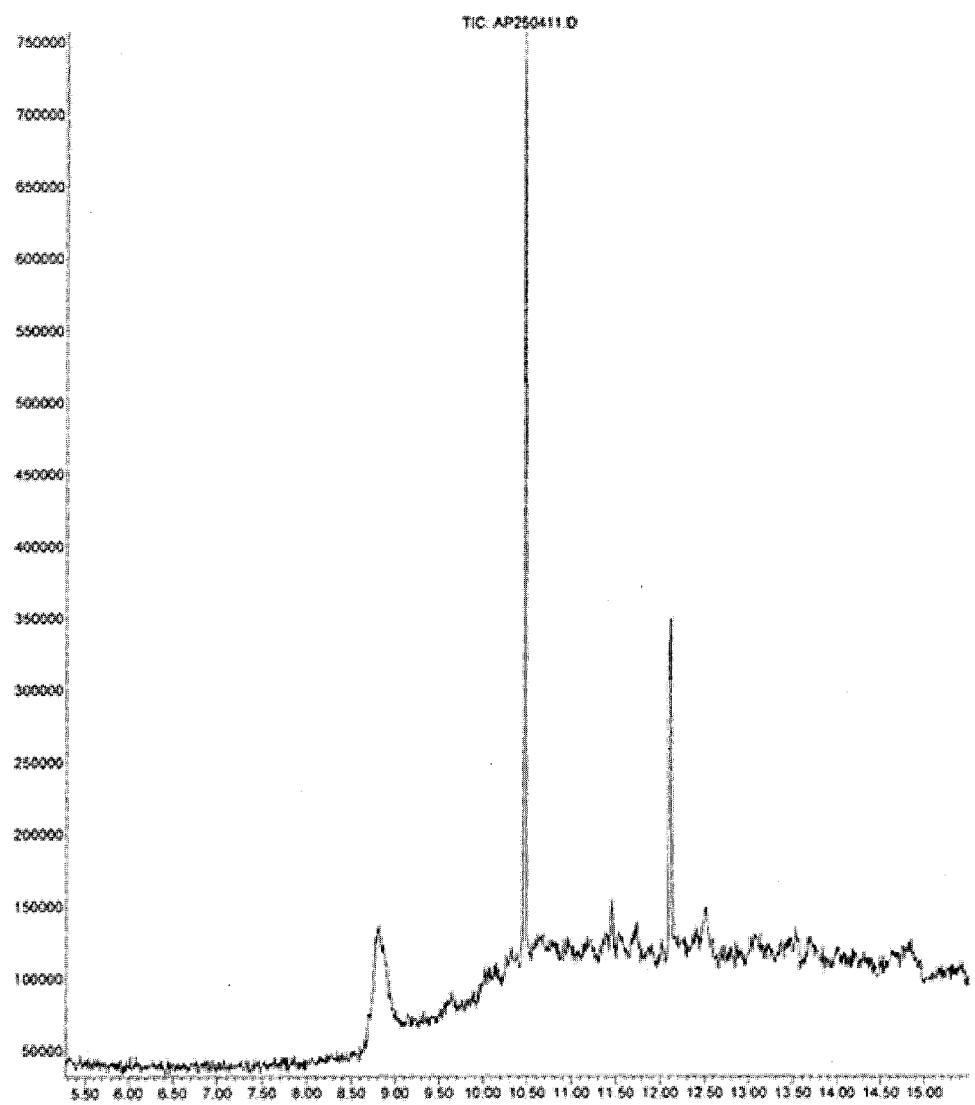
FIG. 5 shows an example 24-hour trial of outgassed VOCs from IR-AC plastic.
Figure 6:
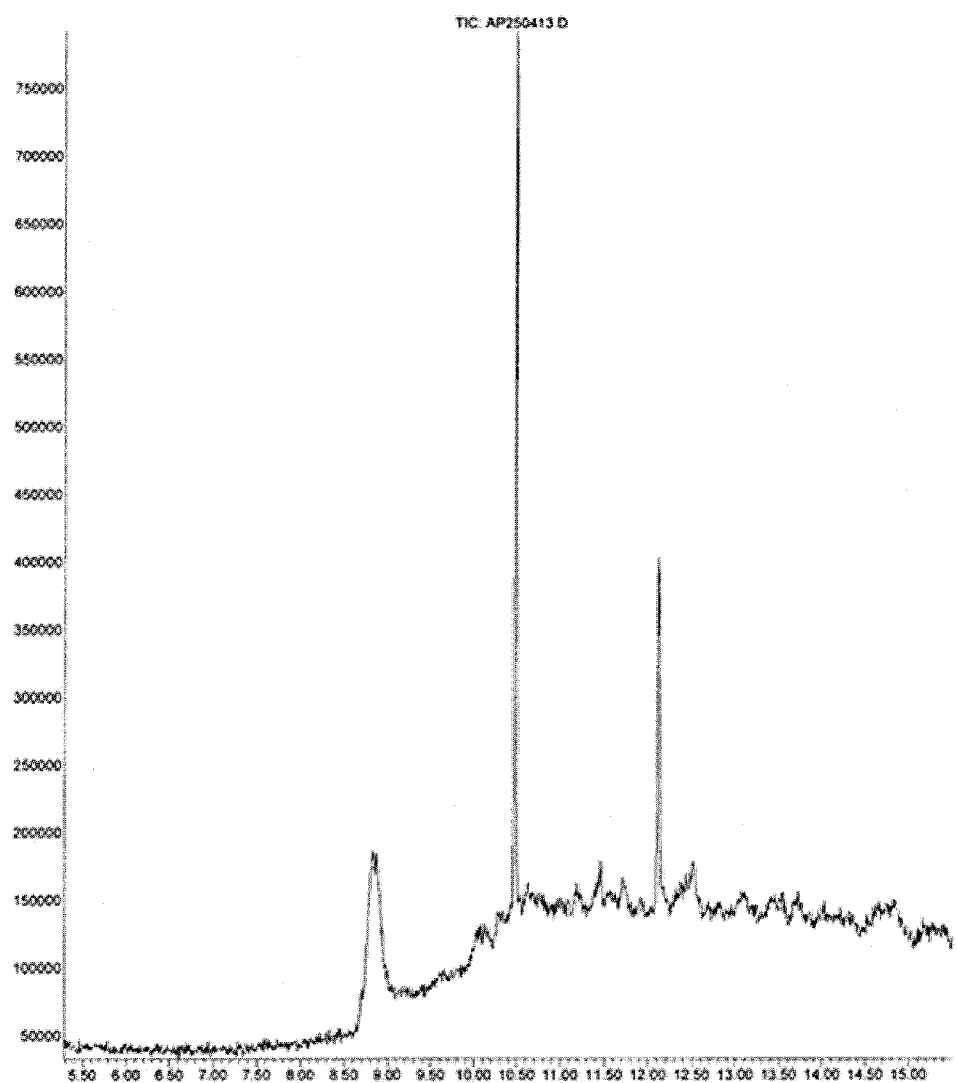
FIG. 6 shows an example 24-hour trial of outgassed VOCs from regular plastic.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the invention including aspects defined in the claims.

The present invention is believed to be applicable to a variety of systems and methods related to preventing plastic out-gassing in low and high tunnels.

In an example embodiment, a method of preventing plastic out-gassing in plant tunnels includes monitoring various environmental indicators present in the tunnels. For example, in certain embodiments, the temperature in the plant tunnel is measured using a temperature sensor to determine the current temperature in the plant tunnel. In more specific embodiments, multiple temperature sensors are placed throughout the tunnel in order to uniformly monitor the temperature over the length of the plant tunnel. Additionally, a humidity sensor is placed in the plant tunnel, and the sensor is monitored to determine a current humidity. In certain embodiments, humidity sensors are placed throughout the plant tunnel in order to ensure a uniform, stable temperature throughout the tunnel.

After the current temperature and current humidity are measured, a difference between the current temperature and the current humidity is compared to a desired ideal temperature and humidity for the plant tunnel. The difference between the current and ideal temperature is then calculated, as is the difference between the current and ideal humidity. Both the ideal humidity and the ideal temperature are adjusted based on the desired environment to be replicated in the plant tunnel. In certain embodiments, various other environment sensors (e.g., moisture sensor, pressure sensor) are used in a manner similar to that of the temperature and humidity sensors.

In response to the environmental sensor indicators (e.g., temperature, humidity, moisture, pressure), various environmental mitigation mechanisms exist in order to adjust the conditions of the high and low tunnels based on the input from the sensors. For example, temperature mechanisms including a fan, an automatic vent in the plastic of the tunnel, air-conditioning unit, are the environmental mitigation mechanisms associated with temperature. Further apparatuses such as humidifier/dehumidifiers, vaporizers, and air-conditioner, are mechanisms for regulating the humidity in the tunnel. Mechanisms for adjusting the pressure include an automatic venting window in the tunnel plastic. For example, a micro-electrical actuator opens the vent window in the plastic.

The calculated difference between the ideal and current temperature is compensated for by adjusting a temperature control unit in the plant tunnel. In certain specific embodiments, multiple temperature control units are placed throughout the plant tunnel in order to ensure uniform temperature adjustment (e.g., heating and cooling). Further, the calculated difference between the ideal and current humidity is compensated for by adjusting a temperature/humidity unit in the plant tunnel. In certain specific embodiments, multiple humidity control units are placed throughout the plant tunnel in order to ensure uniform humidity adjustment (moisture control).

As a function of the calculated difference in temperature, the current temperature, and the adjustments to the temperature control unit, the ideal temperature is maintained by continuously repeatedly monitoring and adjusting the temperature. The ideal humidity is maintained in a similar manner.

In certain specific embodiments, the ideal temperature maintained is altered based on the time of day. For example, in certain environments, the temperature maintained is approximately 35 degrees Centigrade during the day, and 10 degrees Centigrade at night. The ideal humidity is maintained in a similar manner. The ideal temperature and humidity is altered based on the type of environment that is simulated, or the temperature and humidity can be varied to maximize certain plant-type growth conditions (e.g., based on the type of plant in the low or high tunnel).

In certain specific embodiments, the ideal temperature and humidity can be maintained using a hysteresis influenced loop. Hysteresis refers to systems or methods that exhibit path dependence. Path dependence occurs where a current state of a system depends on the path utilized to achieve that state. A control utilizing hysteresis takes into account the data leading up to a set point, and will delay a change to incorporate the predicted future movement of the data. As a result, the data will slowly adjust to the set point, minimizing control changes. A control without hysteresis signals a change based upon reaching a set data point. This could result in rapid amount of control changes as the data hovers around the set data point.

An example of a control utilizing hysteresis is described with reference to a heater mechanism. For example, in a heating mechanism designed to provide heat to an area, a temperature sensor gauges the heat, and engages a heating element once the temperature falls below a set point. Rather than engaging the heating element each time the temperature falls below the set point, the heating mechanism allows the temperature to fall a nominal amount below the set point, taking into account the data history (e.g., the temperature measured by the sensor leading up to that point), and engages the heating element until the temperature sensed is nominally above the set point. Without hysteresis, the heating element would turn on and off rapidly around the set point. Hysteresis takes into account the data history, and allows for gradual changes rather than constant switching.

In another example embodiment, a system for preventing plastic out-gassing in plant tunnels is designed. Included in the system is a plant tunnel, which is a low or high tunnel, for simulating an outdoor plant-growth environment. Included in the system is a temperature sensor which measures the present temperature in the plant tunnel, and outputs a signal characterizing the measured temperature. Also included in the system is a humidity gauge. The humidity gauge determines the current humidity of in the plant tunnel. In certain specific embodiments, the humidity is sensed as a function of the moisture in the tunnel. The determined humidity is characterized by the gauge, and a signal characterizing the current humidity is output.

Also included in the system is a memory circuit. The memory circuit stores information related to the ideal temperature and ideal humidity that is maintained in the plant tunnel. In certain embodiments, the memory circuit is configured to store information related to the data history of the temperature and humidity in the plant tunnel. The system of the instant embodiment utilizes the output of the temperature sensor through a temperature computational circuit. The temperature computational circuit determines the difference between the current temperature, as received from the output of the temperature sensor, and the ideal temperature, which is stored in the memory circuit. The temperature computational circuit then outputs an adjusted temperature signal which is based on the determined difference between the ideal temperature and the current temperature. The system additionally integrates a humidity calculation circuit. The humidity calculation circuit calculates the difference from the output of the humidity sensor with the ideal humidity in the plant tunnel (as stored in the memory circuit), and outputs an adjusted humidity signal.

In order to adjust for the calculated difference between the current temperature and the ideal temperature, a temperature control device is placed in the low tunnel. The temperature control device adjusts the temperature based on the output of the adjusted temperature signal. A humidity control device is also present in order to compensate for the calculated humidity difference using the output of the adjusted humidity signal. In order to continuously adjust the temperature and humidity, the system contains a feedback circuit. The feedback circuit connects the temperature sensor and the humidity sensor with the temperature control mechanism and the humidity control mechanism, respectively, to continuously adjust the temperature and humidity. The feedback circuit maintains the ideal temperature and humidity in the plant tunnel such that plastic out-gassing in the tunnel is prevented, and an ideal plant growth environment is maintained.

In certain specific embodiments, the structure of the plant tunnel, a high or low plant tunnel, is designed to transmit or block UVA, UVB, and UVC light. The plant tunnel is further designed in order to elicit high levels of photosynthetically active radiation. The high or low plant tunnel of the system is typically stabilized using a plastic ribbing structure (e.g., PVC). In certain other embodiments, the feedback circuit includes a hysteresis-type control mechanism. The hysteresis-type mechanism dampens the constant adjusting of the temperature control mechanism and the humidity control mechanism. The temperature and humidity control mechanisms, without hysteresis, would constantly turn on and off around the set-point because the exact temperature and humidity is difficult to maintain. Alternatively, the system includes a range set around the ideal temperature and humidity points. Rather than compensating for the temperature and humidity change each time the current temperature and current humidity deviates from the ideal point, temperature and humidity are maintained in the set range to reduce the off and on switching of the control mechanisms. In certain specific embodiments, the ideal temperature and the ideal humidity stored in the memory circuit are altered based on the desired simulation of different environments.

The risk of outgassing of volatile organic compounds (VOCs) from high or low tunnel plastics was analyzed using gas chromatography-mass spectrometry (GC-MS). Three types of plastic used in high or low tunnel production were tested: Custom Cut Sun Master Pull and Cut Greenhouse Plastic (regular plastic); Custom Cut Sun Master Infrared Anti-condensate Thermal Greenhouse film (IR-AC plastic); and Black 9738 Solar Mulch Plastic (black plastic). 3.0 mm silicon tubing for VOC absorption and desorption was used to measure results.

UV outgassing from the plastics was induced inside a sterile capture chamber, which was prepared by washing a 1 liter glass jar in a 1:1 Hexane-Ethyl Acetate solution, acting as an organic solvent. Because glass filters out almost all external UV light, an internal UV source was provided by a 380-395 nm 9-LED UV flashlight, also washed in solvent and placed inside the chamber. A 50 ml glass flask, acting to hold the silicon absorption tubes and prevent the UV source from making direct contact with the tubes, was washed in solvent and placed inside the chamber. Finally, the lid to the 1 L jar was wrapped in industrial aluminum foil to maintain an inert environment in the chamber. A Teflon® lid could also be used to achieve the same effect.

The silicon tubes were cut into 1 cm sections, each weighing 0.042±0.001 g. Once cut, the tubes were prepared by a double-wash inside a BÜSCHI Rotavap R-110 using 80 ml of an organic solvent. This double wash cleansed the tubes of any absorption residues prior to testing, and the tubes were stored in a −20 degree Celsius freezer until they were needed for absorption.

The experiment involved two trials, each with four treatments, three plastics being tested, along with a negative control. The capture chamber was prepared, as stated above, and one silicon tube was placed inside the chamber using a tweezer washed in organic solvent. Depending on the treatment, the capture chamber also contained a 4"×3" section of regular plastic, IR-AC plastic, black plastic, or no plastic (negative control). The cleansed flashlight was then activated and aluminum top screwed on to seal the chamber. The silicon tube absorbed any volatile outgassed inside the chamber, for either 24 or 48 hours, depending on the trial.

After absorption, the silicon tube was removed from the chamber and placed inside a glass GC-MS crimp-top vial, along with 1 ml of organic solvent. Desorption of VOCs from the tube into the solvent was induced by placing the vial into a 50 degree Celsius heat block and agitating for 45 minutes. The desorbed vial was then placed inside a −80 degree Celsius freezer until all tubes in each trial were ready to be analyzed via GC-MS. 1 ml of each desorbed solvent was transferred into a GC-MS crimp top vial fitted with a glass insert, capped with a Teflon crimp top, and loaded into the GC-MS for analysis. GC-MS was carried out on a HP 5970 GC-MS Single Quad device, and volatile identification was carried out by linking mass spectrometry results with the NIST Standard Online Database.

Figure 7:
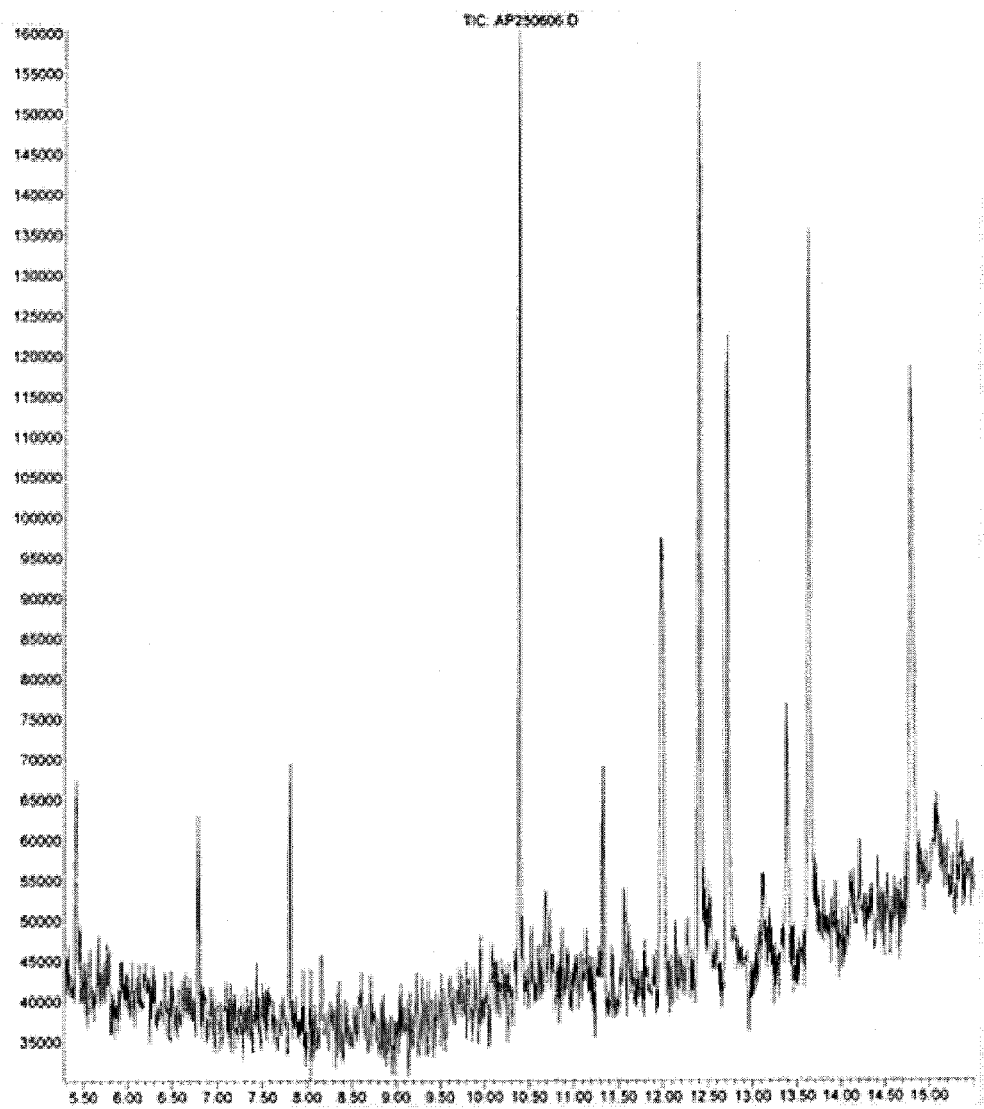
FIG. 7 shows an example 48-hour trial of outgassed VOCs from black plastic.
Figure 8:
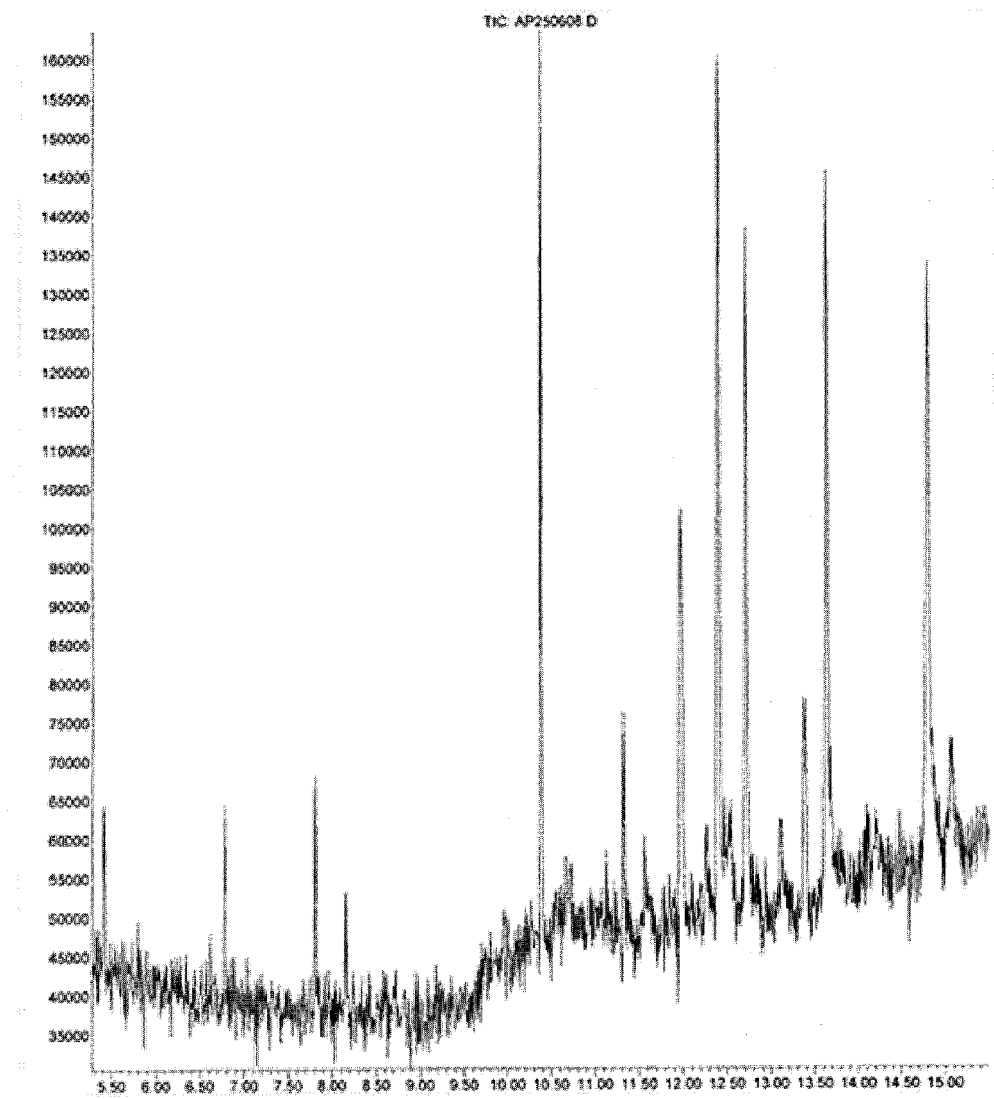
FIG. 8 shows an example 48-hour trial of outgassed VOCs from IR-AC plastic.
Figure 9:
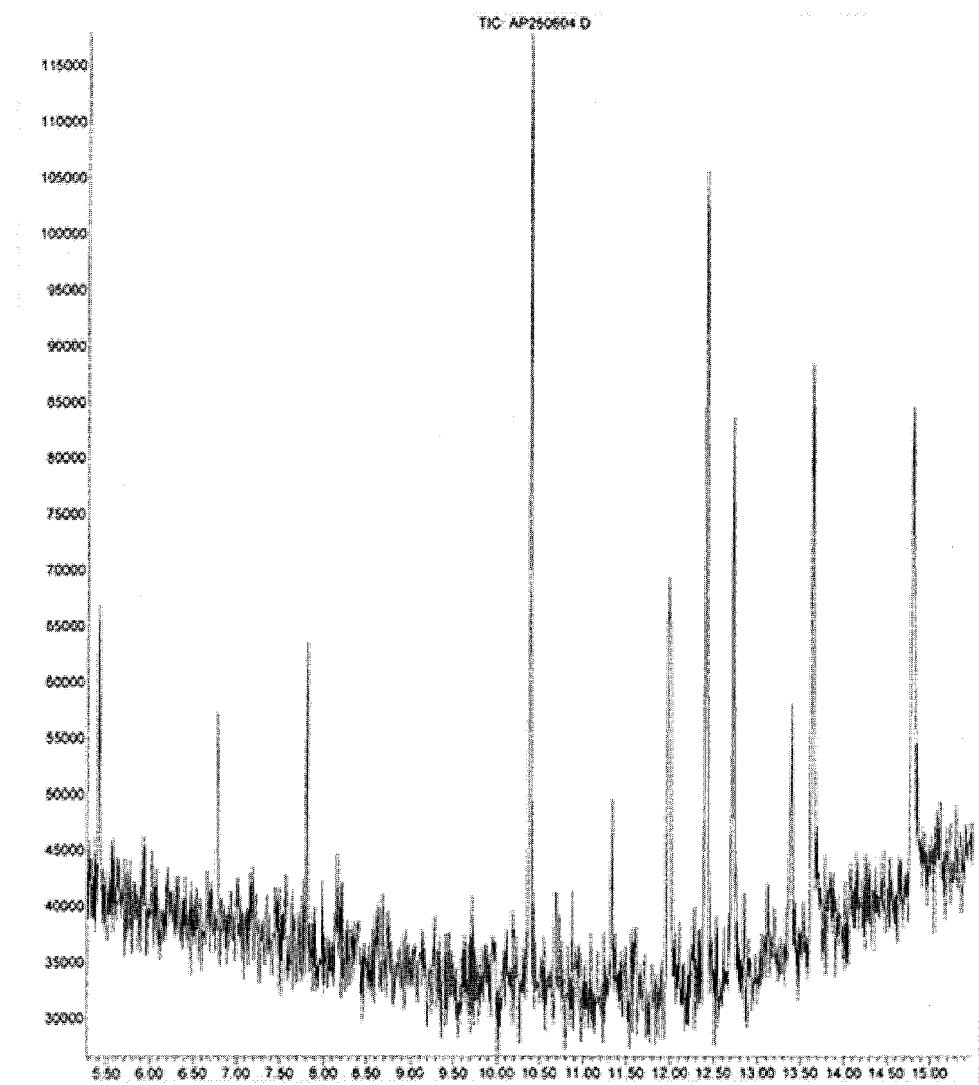
FIG. 9 shows an example 48-hour trial of outgassed VOCs from regular plastic.

In order to determine whether outgassed VOCs from High or Low Tunnel plastics are caused by ultraviolet photo degradation, chromatograms were measure for a 24-hour trial, the results of which are shown in FIGS. 3-6. Phthalate contamination consistently occurred in all treatments of this trial, predominately at 10.50 and 12.15 minutes. Additionally, each treatment in the 48-hour trial are shown in FIGS. 7-9.

Figure 10:
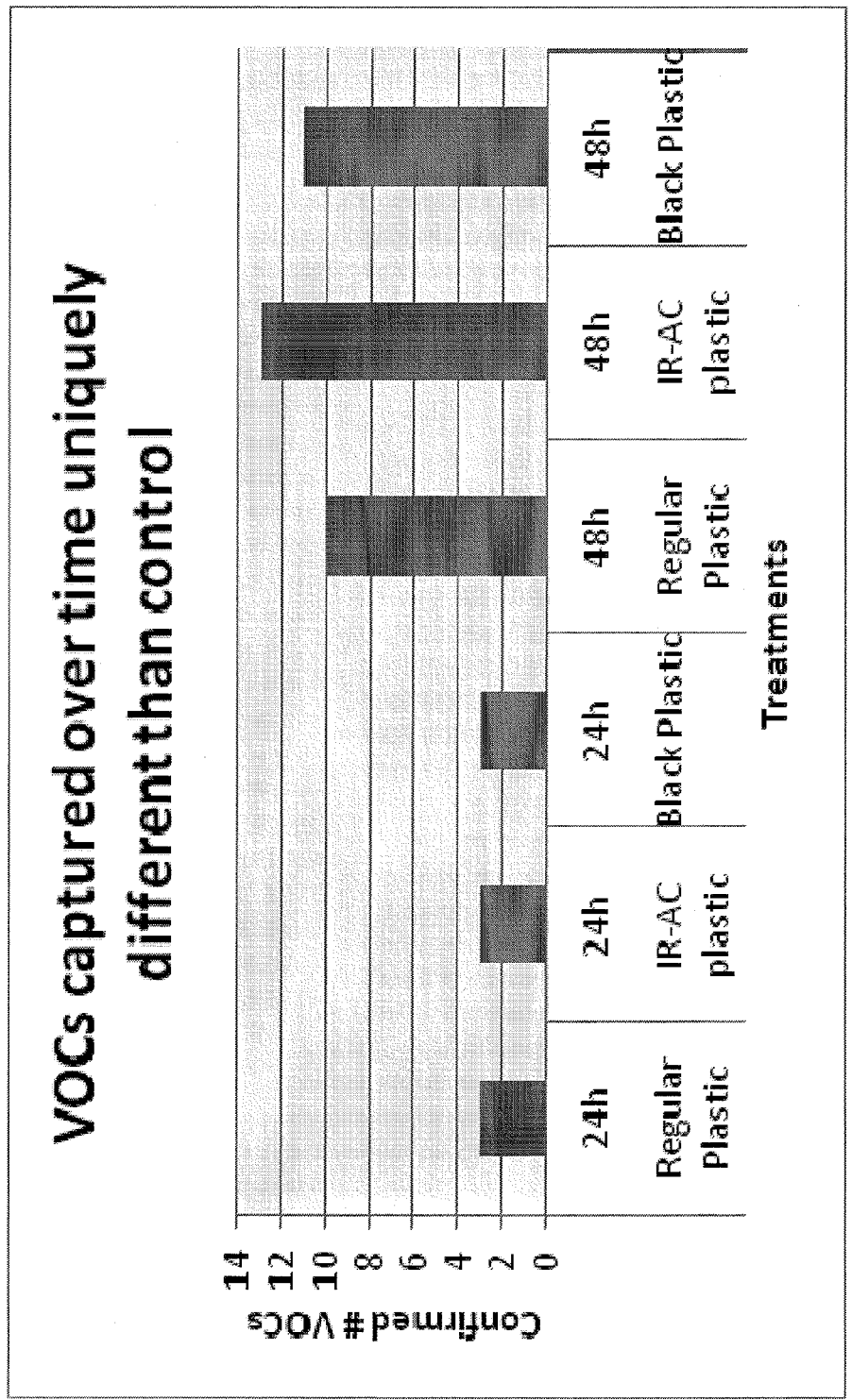
FIG. 10 shows a quantitative summary of confirmed VOCs found in plastic trials.

VOCs were collected within the chamber, and analyzed using gas chromatography-mass spectrometry. The control in the 24-hour trial contained two confirmed VOCs, plasticizing agents known as phthalates. Because these exact phthalates were also found in the three plastic treatments in the 24-hour trial as well, they were regarded as universal contaminants and not considered to be outgassed VOCs from the plastics. Surprisingly, the 24-hour plastic treatments, however, contained three other confirmed VOCs, as shown in FIG. 10. Additionally, the control from the 48-hour trial also contained the same two phthalate contaminants, so these were again subtracted from the total VOC count in the plastic treatments. The regular plastic in the 48-hour trial contained ten confirmed VOCs, the IR-AC plastic contained thirteen confirmed VOCs, and the black plastic contained eleven confirmed VOCs as shown in FIG. 10.

After comparing the control to each of the plastic treatments, especially in the 48-hour trial, UV irradiation of plastics caused a buildup of VOCs in the capture chamber. These results show the surprising finding that prolonged exposure to ultraviolet light contributes to outgassed VOCs from plastics approved for use in organic systems.

The VOCs were also identified. The plastic treatments in the 24-hour trial each had three VOCs: 13-Docosenamide, Hexadecanoic acid and glycine. The plastics in the 48-hour trial yielded thirteen different VOCs, most of which were different forms of chemical compounds called siloxanes, as shown in the Table below. Siloxanes contain silicon bonded to oxygen and hydrocarbon groups. The 48-hour trial also yielded adipic acid, lauric acid and octadecane.

| Names of unique VOCs identified 24 and 48 hours after treatment | |
|---|---|
| 24 hours | 48 hours |
| 13-Docosenamide | Ethyl iso-allochate |
| Hexadecanoic acid (palmitic acid) | B-D-Glucopyranosiduronic acid |
| Glycine | 1-monolinoleolglycerol trimethylsilyl ester |
| | Hexanedioic acid (Adipic acid) |
| | Dodecanoic acid (Lauric acid) |
| | Hepta Siloxane |
| | Octa Siloxane |
| | Octadecane |
| | 3',8',8'-Trimethoxy-3-piperidyl-2,2'-binaphthalene-1,1',4,4'-tetrone |
| | 1,2-Benzenedicarboxylic acid |
| | Oxiranedodecanoic acid |
| | Glycine |
| | 2,4-Imidazolidinedione |

Through these experiments, three trends have been found: (1) In each trial, there are VOCs in the plastic treatments not present in the control, (2) Within each trial, each of the three plastic treatments elute similar VOCs in similar concentrations, and (3) the plastic treatments in the 48-hour trial have more VOCs than the plastic treatments in the 24-hour trial. Not only does this indicate that VOCs are indeed being outgassed under UV irradiation, but additionally and surprisingly that the quantity of VOCs being outgassed increases as time exposed to UV irradiation progresses.

Every VOC that has been identified is known to be involved and used in at least one aspect of plastic production. Siloxanes are plastic additives that are used to provide flexibility, abrasion resistance and heat resistance. Adipic acid is a key ingredient in making polyester polyols, and 13-Docosenamide is added to plastics to increase anti-static qualities. Some VOCs discovered were compounds that aren't intended to be found on the final plastic product, but are still used in the production process. Hexadecanoic acid, also known as palmitic acid, is used in plastic production as a releaser agent to help remove plastics from their moulding material. Lauric acid and octadecane are used as lubricants.

While most of the VOCs found are classified as non-toxic, palmitic acid has been shown to promote insulin resistance in the brain and central nervous system. Insulin is a critical component in the appetite-suppressing signals created in the brain, and insulin resistance has been shown to contribute to obesity. The World Health Organization places palmitic acid on the same level as trans-fatty acids in terms of its potential to increase the risk of developing cardiovascular disease.

Based upon the above discussion and illustrations, those skilled in the art will readily recognize that various modifications and changes may be made to the present invention without strictly following the exemplary embodiments and applications illustrated and described herein. Such modifications do not depart from the true spirit and scope of the present invention, including that set forth in the following claims.

What is claimed is:

1. A method of preventing plastic out-gassing in plant tunnels; comprising:
monitoring temperature in a plant tunnel using one or more temperature sensor(s) to determine a current temperature in the plant tunnel;
monitoring humidity in the plant tunnel using one or more humidity sensor(s) to determine a current humidity in the plant tunnel;
calculating a difference between the determined current temperature in the plant tunnel and an ideal temperature in the plant tunnel;
calculating a difference between the determined current humidity in the plant tunnel and an ideal humidity in the plant tunnel;
adjusting a temperature control mechanism to compensate for the calculated difference between the current temperature in the plant tunnel and the ideal temperature in the plant tunnel;
adjusting a humidity control mechanism to compensate for the calculated difference between the current humidity in the plant tunnel and the ideal humidity in the plant tunnel; and
maintaining the ideal temperature and ideal humidity in response to a feedback circuit monitoring the temperature and humidity in the plant tunnel, calculating the difference between the determined current temperature and humidity in the plant tunnel, and adjusting the temperature and humidity in the plant tunnel based on the calculated difference between the current temperature and humidity and the ideal temperature and humidity.

2. The method of claim 1, wherein the plant tunnel is a low tunnel.

3. The method of claim 1, wherein the plant tunnel is a high tunnel.

4. The method of claim 1, wherein maintaining the ideal temperature and ideal humidity represents an outdoor plant growth environment.

5. The method of claim 1, wherein maintaining the ideal temperature and ideal humidity in the plant tunnel increases lifetime of materials used in the plant tunnel construction.

6. The method of claim 1, wherein the ideal temperature maintained is approximately 35 degrees Centigrade during the day, and 10 degrees Centigrade at night.

7. The method of claim 1, wherein the ideal humidity maintained is between 40-60%.

8. The method of claim 1, wherein the step of maintaining the ideal temperature and the ideal humidity can be varied based on different simulated environments.

9. The method of claim 1, wherein the step of maintaining the ideal temperature and the ideal humidity can be varied based on plant-type growth conditions.

10. The method of claim 1, wherein the step of maintaining the ideal temperature utilizes a hysteresis-type loop such that the steps of adjusting the temperature and humidity are dampened.

11. A system for preventing plastic out-gassing in plant tunnels, comprising:
a plant tunnel designed to simulate an outdoor plant-growth environment;
a temperature sensor, configured and arranged to sense a current temperature in the plant tunnel, and output a signal characterizing the current temperature;
a humidity sensor, configured and arranged to sense a current humidity in the plant tunnel and output a signal characterizing the current humidity;
a memory circuit having a stored ideal temperature in the plant tunnel and a stored ideal humidity in the plant tunnel;
a temperature computational circuit configured and arranged to calculate a difference between the current temperature received from the output of the temperature sensor, with the ideal temperature in the plant tunnel, and output an adjusted temperature signal;
a humidity calculation circuit configured and arranged to calculate the difference between the current humidity received from the output of the humidity sensor, with the ideal humidity in the plant tunnel, and output an adjusted humidity signal;

a temperature control mechanism to compensate for the calculated temperature difference based on the output of the adjusted temperature signal;

a humidity control mechanism to compensate for the calculated humidity difference based on the output of the adjusted humidity signal; and a feedback circuit that communicatively connects the temperature sensor and the humidity sensor with the temperature control mechanism and the humidity control mechanism to adjust the temperature and humidity.

12. The system of claim 11, wherein the plant tunnel is a low tunnel.

13. The system of claim 11, wherein the plant tunnel is a high tunnel.

14. The system of claim 11, wherein the plant tunnel is configured and arranged to transmit or block UVA, UVB, and UVC light, and elicit high levels of photosynthetically active radiation.

15. The system of claim 11, wherein the plant tunnel is mechanically stabilized using a plastic ribbing structure.

16. The system of claim 11, wherein the feedback circuit is implemented using a hysteresis control mechanism that dampens the temperature control mechanism and the humidity control mechanism compensation.

17. The system of claim 11, wherein the ideal temperature and the ideal humidity can be varied based on different simulated environments.

* * * * *